(12) United States Patent
Lee et al.

(10) Patent No.: US 10,949,569 B2
(45) Date of Patent: Mar. 16, 2021

(54) ADAPTIVE ON-DEVICE STORAGE MANAGEMENT ACROSS MULTIPLE APPLICATIONS

(71) Applicant: International Business Machines Corporation, Armonk, NY (US)

(72) Inventors: Sunhwan Lee, Menlo Park, CA (US); Rakesh Jain, San Jose, CA (US); Mu Qiao, Belmont, CA (US); Divyesh Jadav, San Jose, CA (US); Luis Angel Bathen, Placentia, CA (US); Ramani R. Routray, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 16/163,443

(22) Filed: Oct. 17, 2018

(65) Prior Publication Data

US 2020/0125748 A1 Apr. 23, 2020

(51) Int. Cl.
*G06F 21/62* (2013.01)
*G06F 21/44* (2013.01)
*H04L 29/06* (2006.01)
*G06F 21/60* (2013.01)

(52) U.S. Cl.
CPC ............ *G06F 21/629* (2013.01); *G06F 21/44* (2013.01); *G06F 21/606* (2013.01); *H04L 63/12* (2013.01); *H04L 2463/101* (2013.01)

(58) Field of Classification Search
CPC ...... G06F 21/629; G06F 21/44; G06F 21/606; H04L 63/12; H04L 2463/101
See application file for complete search history.

(56) References Cited

U.S. PATENT DOCUMENTS

| 7,206,806 | B2 | 4/2007 | Pineau |
| 7,546,335 | B2 | 6/2009 | Moeller et al. |
| 8,200,626 | B1 | 6/2012 | Katzer et al. |
| 8,984,031 | B1* | 3/2015 | Todd ............. G06F 16/13 707/823 |
| 9,602,474 | B2 | 3/2017 | Barton et al. |
| 2005/0213763 | A1* | 9/2005 | Owen ............. H04W 12/08 380/270 |
| 2007/0185899 | A1 | 8/2007 | Ziv et al. |

(Continued)

*Primary Examiner* — Joseph P Hirl
*Assistant Examiner* — Stephen T Gundry
(74) *Attorney, Agent, or Firm* — Zilka-Kotab, P.C.

(57) ABSTRACT

A computer-implemented method according to one embodiment includes receiving a data object from a first application running on a computing device, a unique identifier (ID) of the data object assigned by the first application, and an access permission for the data object from the first application. The computer-implemented method also includes storing the data object, the unique ID, and the access permission in a data repository in a data distributor layer on the computing device. The computer-implemented method also includes receiving, at an access controller layer of the computing device, a request for the data object from a second application, the request including the unique ID, and retrieving, by the access controller layer, the data object from the data distributor layer using the unique ID in response to the request. The computer-implemented method includes providing, by the access controller layer, the data object to the second application.

20 Claims, 4 Drawing Sheets

(56) References Cited

U.S. PATENT DOCUMENTS

| | | | |
|---|---|---|---|
| 2013/0110891 A1* | 5/2013 | Ogasawara | G06F 16/1824 707/827 |
| 2014/0006441 A1* | 1/2014 | Torman | G06F 21/6218 707/769 |
| 2015/0006884 A1* | 1/2015 | Ackerly | G06F 21/6209 713/155 |
| 2015/0220561 A1* | 8/2015 | Goetz | G06F 16/178 707/827 |
| 2015/0269203 A1* | 9/2015 | Baldwin | G06F 16/2228 707/741 |
| 2017/0228266 A1* | 8/2017 | Johansson | G06F 21/606 |
| 2017/0264619 A1* | 9/2017 | Narayanaswamy | G06F 21/6209 |
| 2019/0109852 A1* | 4/2019 | Ranganathan | G06F 21/6218 |
| 2019/0278931 A1* | 9/2019 | Tobias | H04L 9/3239 |
| 2020/0068026 A1* | 2/2020 | Morkovine | G06F 9/451 |
| 2020/0104532 A1* | 4/2020 | Anderson | H04L 63/0227 726/1 |

\* cited by examiner

ADAPTIVE ON-DEVICE STORAGE MANAGEMENT ACROSS MULTIPLE APPLICATIONS

BACKGROUND

The present invention relates to device file management and more specifically, this invention relates to adaptive on-device storage management across multiple applications.

There are many applications which are capable of sharing data with a plurality of other applications. Such applications include photo sharing applications, text conversation applications, social media applications, etc. Each application typically stores a separate copy of the data on a mobile device or elsewhere. The large volume of data stored and consumed by applications on mobile devices affects the efficiency and/or speed of retrieving such data.

SUMMARY

A computer-implemented method according to one embodiment includes receiving a data object from a first application running on a computing device, receiving a unique identifier (ID) of the data object, the unique ID being assigned by the first application, and receiving an access permission for the data object from the first application. The computer-implemented method also includes storing the data object, the unique ID, and the access permission in a data repository in a data distributor layer on the computing device. The computer-implemented method also includes receiving, at an access controller layer of the computing device, a request for the data object from a second application, the request including the unique ID, and retrieving, by the access controller layer, the data object from the data distributor layer using the unique ID in response to the request. The computer-implemented method includes providing, by the access controller layer, the data object to the second application.

A computer program product for adaptive on-device management across multiple applications according to one embodiment includes a computer readable storage medium having program instructions embodied therewith. The computer readable storage medium is not a transitory signal per se. The program instructions are executable by a computer to cause the computer to perform a method that includes receiving a data object from a first application running on a computing device, receiving a unique identifier (ID) of the data object, the unique ID being assigned by the first application, and receiving an access permission for the data object from the first application. The method also includes storing the data object, the unique ID, and the access permission in a data repository in a data distributor layer on the computing device. The method includes receiving, at an access controller layer of the computing device, a request for the data object from a second application, the request including the unique ID, and retrieving, by the access controller layer, the data object from the data distributor layer using the unique ID in response to the request. The method also includes providing, by the access controller layer, the data object to the second application.

A system according to one embodiment includes a processor and logic integrated with the processor, executable by the processor, or integrated with and executable by the processor. The logic is configured to receive a data object from a first application running on a computing device, receive a unique identifier (ID) of the data object, the unique ID being assigned by the first application, and receive an access permission for the data object from the first application. The logic is also configured to store the data object, the unique ID, and the access permission in a data repository in a data distributor layer on the computing device. The logic is configured to receive, at an access controller layer of the computing device, a request for the data object from a second application, the request including the unique ID, and retrieve, by the access controller layer, the data object from the data distributor layer using the unique ID in response to the request. The logic is also configured to provide, by the access controller layer, the data object to the second application.

Other aspects and embodiments of the present invention will become apparent from the following detailed description, which, when taken in conjunction with the drawings, illustrate by way of example the principles of the invention.

DETAILED DESCRIPTION

Figure 1:
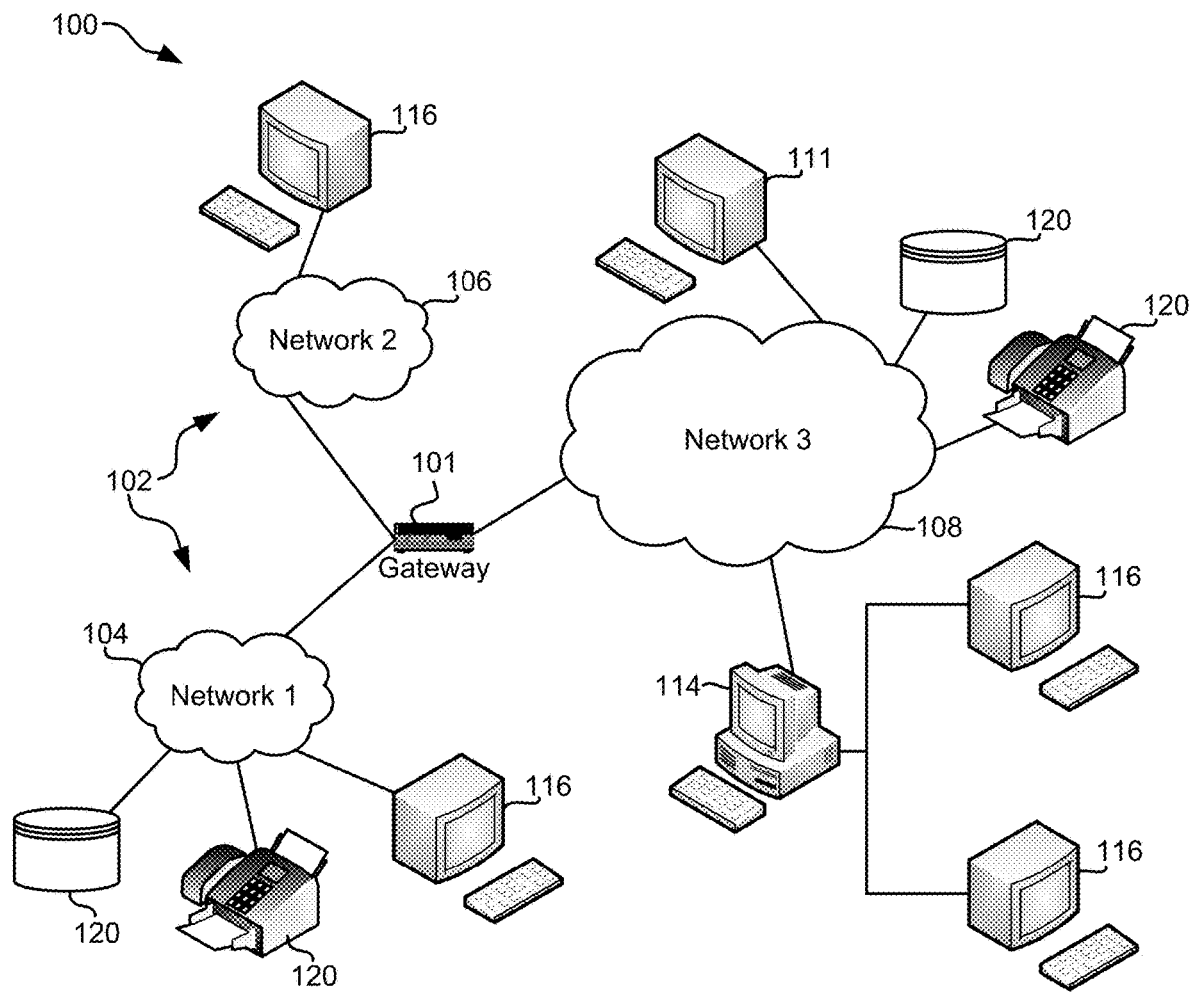
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for adaptive on-device storage management across multiple applications.

In one general embodiment, a computer-implemented method includes receiving a data object from a first application running on a computing device, receiving a unique identifier (ID) of the data object, the unique ID being assigned by the first application, and receiving an access permission for the data object from the first application. The computer-implemented method also includes storing the data object, the unique ID, and the access permission in a data repository in a data distributor layer on the computing device. The computer-implemented method also includes receiving, at an access controller layer of the computing device, a request for the data object from a second application, the request including the unique ID, and retrieving, by the access controller layer, the data object from the data distributor layer using the unique ID in response to the request. The computer-implemented method includes providing, by the access controller layer, the data object to the second application.

In another general embodiment, a computer program product for adaptive on-device management across multiple applications includes a computer readable storage medium having program instructions embodied therewith. The computer readable storage medium is not a transitory signal per se. The program instructions are executable by a computer to cause the computer to perform a method that includes receiving a data object from a first application running on a computing device, receiving a unique identifier (ID) of the data object, the unique ID being assigned by the first application, and receiving an access permission for the data object from the first application. The method also includes storing the data object, the unique ID, and the access permission in a data repository in a data distributor layer on the computing device. The method includes receiving, at an access controller layer of the computing device, a request for the data object from a second application, the request including the unique ID, and retrieving, by the access controller layer, the data object from the data distributor layer using the unique ID in response to the request. The method also includes providing, by the access controller layer, the data object to the second application.

In yet another general embodiment, a system includes a processor and logic integrated with the processor, executable by the processor, or integrated with and executable by the processor. The logic is configured to receive a data object from a first application running on a computing device, receive a unique identifier (ID) of the data object, the unique ID being assigned by the first application, and receive an access permission for the data object from the first application. The logic is also configured to store the data object, the unique ID, and the access permission in a data repository in a data distributor layer on the computing device. The logic is configured to receive, at an access controller layer of the computing device, a request for the data object from a second application, the request including the unique ID, and retrieve, by the access controller layer, the data object from the data distributor layer using the unique ID in response to the request. The logic is also configured to provide, by the access controller layer, the data object to the second application.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
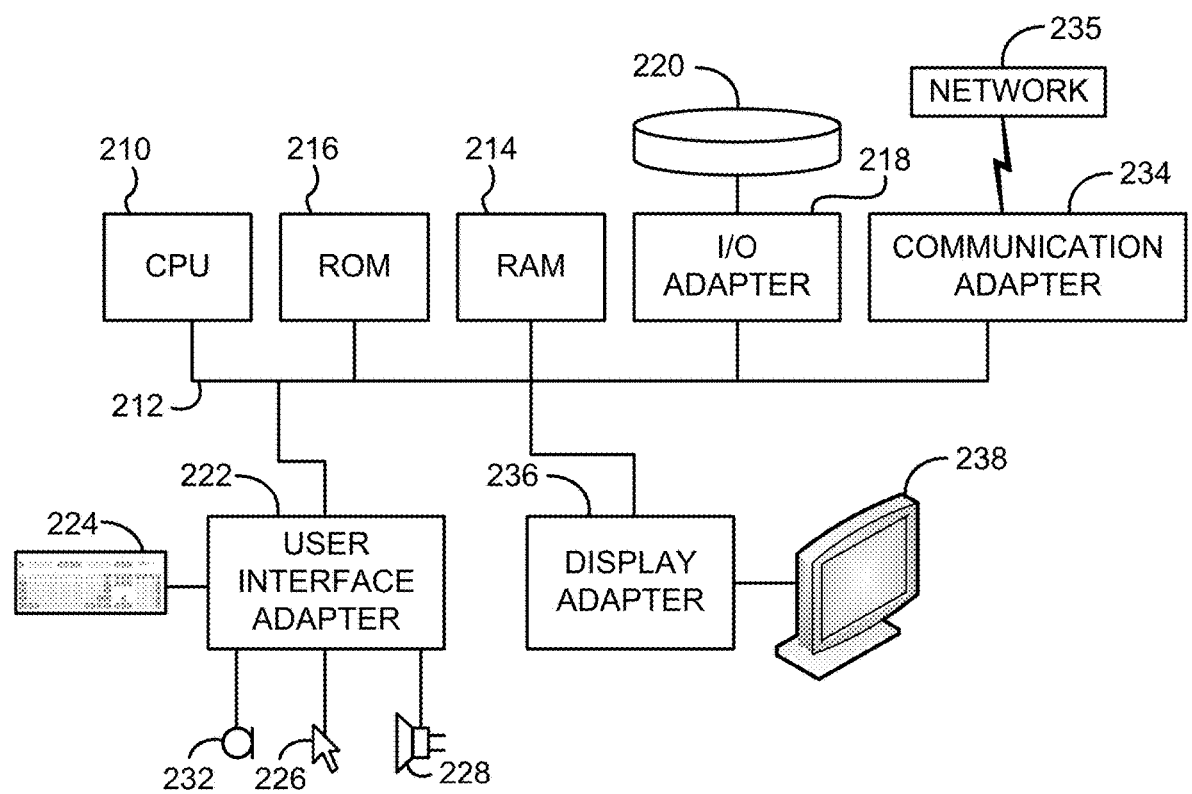
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
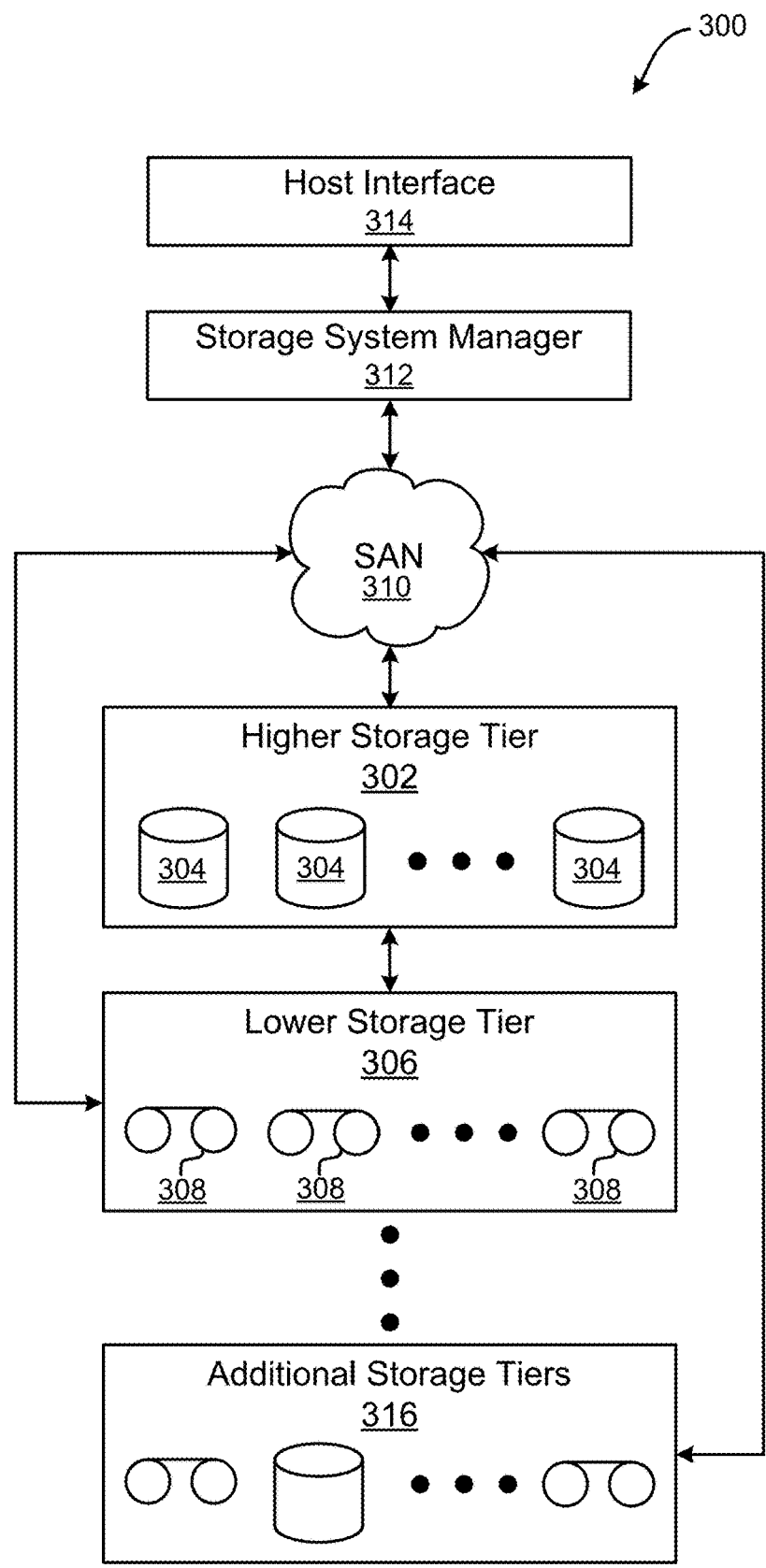
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

On-device storage is often managed inefficiently due to multiple applications storing multiple copies of the same data on the device. Multiple applications may store multiple copies of data in multiple locations which may lead to issues regarding ownership of the data. This multiplicative storage consumption leads to delays in access to the data and/or uncertainty as to the owner of the data, not to mention using more storage space. Multiple service providers, access providers, application developers, etc. may assert ownership of data making it difficult to track the origin of data.

A service provider may be internal service providers, shared service providers, external service providers, application service providers (ASP), network service providers (NSP), internet service providers (ISP), managed service providers (MSP), storage service providers (SSP), telecommunication service providers (TSP), master managed service provider (MMSP), managed internet service provider (MISP), online service providers, payment service provider (PSP), a software, platform, infrastructure service provider, or any other service providers known in the art. Application developers may be any company and/or software which creates applications known in the art. As described herein, a service provider and an application developer may have separate functions. However, it should be noted that a service provider may interchangeably be considered an application developer and vice versa.

Figure 4:
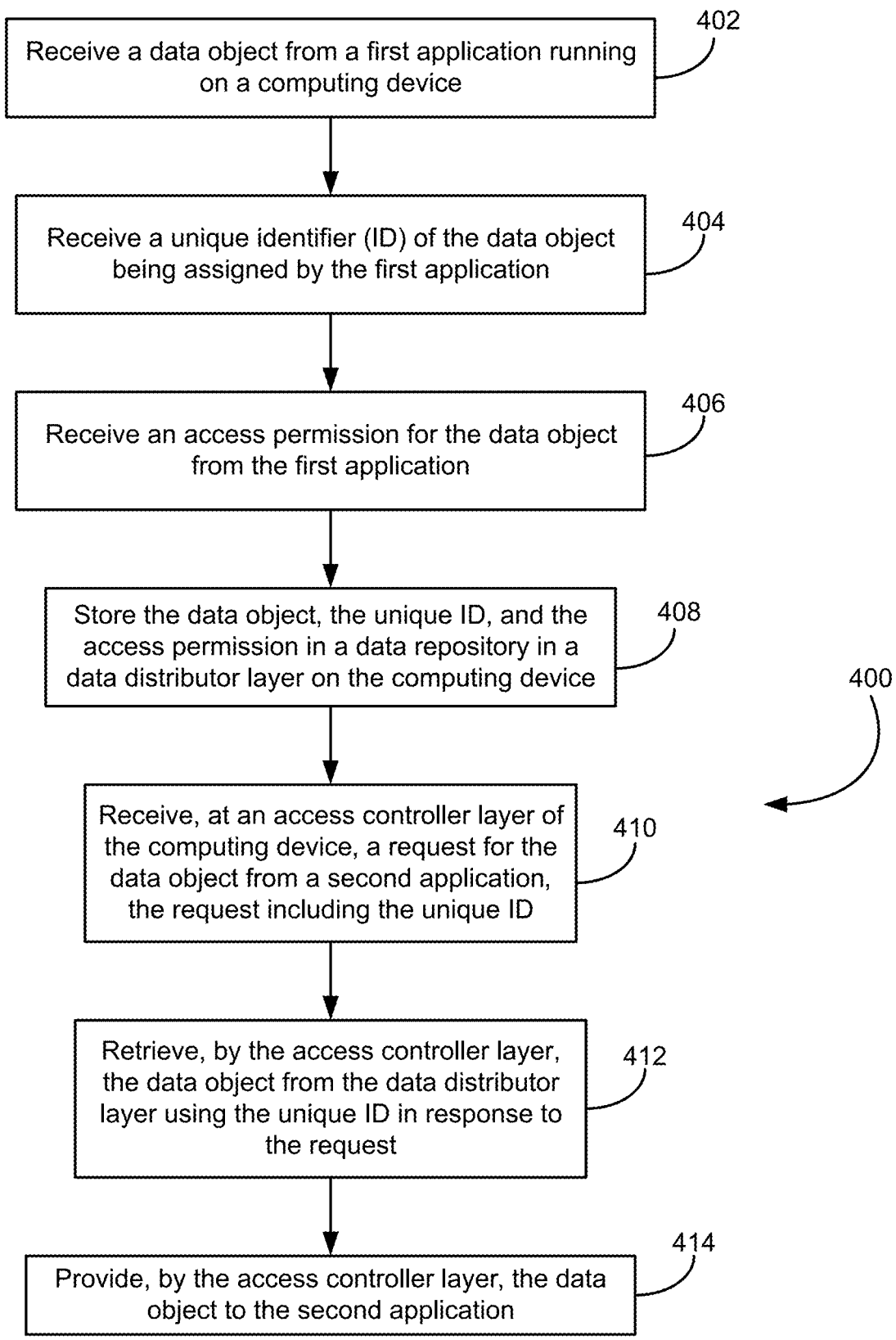
FIG. 4 is a computer-implemented method according to one embodiment.

Now referring to FIG. 4, a flowchart of a method 400 is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a computing device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where the computer-implemented method comprises receiving a data object from a first application running on a computing device such as a mobile device (e.g., phone, tablet, etc.), laptop, personal computer, etc. In one embodiment, the data object is received, from a first application running on a computing device, directly by the computing device. In another embodiment, the data object is received via direct connection, via a network including a fixed broadband internet, mobile internet, virtual private network (VPN), LAN, direct networks, etc. In an exemplary embodiment, the data object may be received via Bluetooth, Wi-Fi, Radio Frequency Identification (RFID), etc.

A data object may comprise image data, motion image data, audio recording data, textual data, any other type of data known in the art, and any combination of data types known in the art.

In one embodiment, a first application running on a computing device may generate the data object. The first application may be a web browser, a single function application, a social media application, an office productivity application, a design application which may include a music synthesizer, a video production package, etc., a software development application, a management application, a workflow application, an analytics application, an entertainment application which may include a media player, a gaming interface, camera application, or any type of application known in the art.

Operation 404 of method 400 includes receiving a unique identifier (ID) of the data object, the unique ID being assigned by the first application. In one embodiment, the unique ID of the data object, assigned by the first application, is received directly by the computing device. In another embodiment, the unique ID of the data object, assigned by the first application, is received via direct connection, via a network including a fixed broadband internet, mobile internet, VPN, LAN, direct networks, etc. In an exemplary embodiment, the unique ID of the data object, assigned by the first application, may be received via Bluetooth, Wi-Fi, RFID, etc.

A unique ID may comprise a filename generated by the user of the application, a filename generated by the application, a filename generated by the device, an extension of the data object associated with a type of data object, a network device, a hardware device, a hardware drive, a directory tree, a version number, etc. In one approach, a unique ID may comprise any combination thereof.

In one embodiment, the unique ID is not a filename of the data object. In a preferred embodiment, a unique ID assigned by the first application is unique to each individual data object regardless of whether the data object was generated substantially simultaneously with another data object.

Operation 406 of method 400 includes receiving an access permission for the data object from the first application.

In one embodiment, the access permission for the data object from the first application, is received directly by the computing device. In another embodiment, the access permission for the data object from the first application, is received via direct connection, via a network including a fixed broadband internet, mobile internet, VPN, LAN, direct networks, etc. In an exemplary embodiment, the access permission for the data object from the first application, may be received via Bluetooth, Wi-Fi, RFID, etc.

An access permission may allow access to a particular data object, a particular server, a particular application, etc. The access permission may allow modifications, the rights to read, write, erase, modify, cut, copy, paste, and/or any other access rights known in the art. The access permission may assign the access rights to a particular data object, a particular server, a particular application, etc.

In one embodiment, the access permission is assigned based on the category of the second application. For example, the first application which is a photo generating application may assign a read only access permission to a second application which is an instant messaging application. The first application which is a photo generating application may assign a second application which is a photoshop application all access permissions which are available.

In one embodiment, the access permission may be set based on parameters set by a user, a service provider, an application developer, etc. In a preferred embodiment, the access permission is set based on parameters provided by a service provider of the first application.

In another embodiment, the first application which generates the data object may have all access rights associated with an access permission to the data object. The first application may also limit the access permission for all other applications, service providers, application developers, etc.

In yet another embodiment, the unique ID may comprise the unique ID for the data object and the access permission for the data object. The unique ID may comprise metadata associated with the data object. Metadata may include descriptive metadata, structural metadata, administrative metadata, reference metadata and/or statistical metadata or any other type of metadata known in the art. In one embodiment, the unique ID may include a timestamp of the event. In another embodiment, the unique ID may include positional and/or direction information about the geographical location where the data object was generated.

Operation 408 of method 400 includes storing the data object, the unique ID, and the access permission in a data repository in a data distribution layer on the computing device.

The data object, the unique ID, and the access permission may be stored in any format known in the art. In one approach, the data object, the unique ID, and the access permission may be stored in a table in a data repository in a data distribution layer on the computing device.

In one embodiment, the data distribution layer may set the policy for the network in the computing device. The policy for the network in the computing device may include access lists, routing updates, route summaries, Virtual Local Area Network (VLAN) traffic, address aggregation, etc. The data distribution layer may also include the routing, filtering, queuing, manipulation, processing, regulating etc. of packets based on the source of the packets and/or the destination of the packets. The data distribution layer may exercise control over network transmissions including the transmission of data objects. The data distribution layer may comprise a data repository.

Operation 410 of method 400 includes receiving, at an access controller layer of the computing device, a request for the data object from a second application, the request including the unique ID. In one embodiment, the access controller layer of the computing device includes an interface which grants access to the network to devices, users, servers, etc. The access controller layer may provide access of data objects to applications which the access controller layer determines have the appropriate permission to access the data objects based on the access permission.

In one embodiment, the access controller layer receives a request to share the data object via the second application without the unique ID. In response to determining the second application has permission to access the data object based on an access permission, the access controller layer sends the unique ID to the second application. The second application may then request the data object by sending a request for the data object that includes the unique ID. For example, assume a user wants to send a picture via a social media app. The camera app is set to provide access permission to all social media applications for the images it creates. Once the user opens the social media app and selects a "send image" button, the social media app sends a request to the access control layer, which, in response to receiving the request, determines that the social media app has permission to access the images, and sends the unique IDs of the images. Then, the social media app can request any of the images using the corresponding unique ID.

In one embodiment, the access controller layer enforces the access control in between other applications and the data object, as specified by the first application in operation 406. The first application may have all the access rights associated with the data object. The first application may limit the right of access to the data object for other applications via the access permission provided thereby. The first application may thus, in effect, manage and enforce any limitations on access to the data object via the access controller layer.

In an alternative embodiment, the service provider may grant the right of access to the data object for other applications. The service provider may limit the right of access to the data object for other applications. As mentioned above, the service provider may interchangeably be considered the application developer and vice versa.

In yet another embodiment, access permission including access rights may be assigned and/or limited by a user agreement between applications, between an application and a service provider, between a user and an application and/or a service provider, etc.

In one embodiment, the second application does not have direct access to the original data object through the access controller layer. The second application may only receive the unique ID. The unique ID refers to the data object in the data distribution layer. The access controller layer of the computing device may retrieve the data object from the data distribution layer in response to determining that the second application has requested the data object with the corresponding unique ID and is authorized to access the data object per the access permission associated with the data object. The second application may have limited access rights, e.g., as defined in the access permission. An example of limited access rights may include a second application which may receive the data object without the access permission to store an original copy of the data object with the unique ID.

The second application may be a web browser, a single function application, an office productivity application, a design application which may include a music synthesizer, a video production package, a software development application, a management application, a workflow application, an analytics application, an entertainment application which may include a media player, a game interface, a social media application, and/or any type of application known in the art.

In one embodiment, the second application does not store a copy of the data object. For example, the second application does not duplicate the original data object where the data object is accessible via the unique ID. Rather, the second application can access the original data object using the unique ID, so long as the second application has access per the access permission for the data object. This feature reduces the amount of storage needed in order for multiple applications to use the data object by allowing the applications to use the same instance of the data object.

In yet another embodiment, the first application may assert ownership of the data object. Data ownership may include legal rights, control, acquisition, use, distribution, etc. of the data object. In one embodiment, data ownership includes a data governance process which entitles the owner to create, edit, modify, share, restrict access, assign, share, and/or surrender data objects. Data ownership may additionally include copyrights to data objects.

In a preferred embodiment, the first application may assert ownership where access permission provided to other applications prevents other applications from storing duplicate copies of the original data object with the unique ID. The first application may assert ownership through the use of the unique ID which associates the data object with the application which generated the data object. Ownership in this case may be defined as the ability to store a copy of the original data object with the unique ID associated with the data object. The unique ID may allow tracking of the original data object.

Alternatively, the first application which generated the data object may assign ownership of the data object to a service provider (which may also be the application developer), another application, etc. Ownership may be defined through a user agreement between applications, between an application and a service provider, between a user and an application and/or a service provider, etc.

In one embodiment, the second application asserts ownership of the data object by providing the unique ID to a service provider of the second application without duplicating the data object.

Operation 412 of method 400 includes retrieving, by the access controller layer, the data object from the data distributor layer using the unique ID in response to the request, so long as the second application has permission to access the object per the access permission. The access controller layer of the computing device may retrieve the data object from the data distribution layer, which may retrieve the actual data object from memory and send it to the access controller layer.

Operation 414 of method 400 includes providing, by the access controller layer, the data object to the second application. In one embodiment, the access controller layer provides the data object to the second application faster than if the first application copied and pasted the original data object to another memory location associated with the second application. Likewise, this process is faster than if the second application received the data object, stores a duplicate copy, and then uses that duplicate copy. This process may be more efficient for communicating data objects across multiple applications rather than duplicating the data object in multiple locations on the computing device.

In one embodiment, the first application which generated the data object maintains the unique ID of the data object after providing, by the access controller layer, the data object to the second application.

An illustrative example of the computer-implemented method includes a photo application in use with an instant messaging application. A photo may be taken by a mobile device using the photo application. The photo is stored in the data distribution layer of the mobile device. The photo application which generated the photo (e.g. the data object) also generates a unique ID which is specific to the particular photo. The photo application additionally assigns the photo an access permission based on a category of the second application. The category of second application may include the type of application. For example, a read and write access permission may be assigned based on the second application as an instant messaging application. Another example may include a read only access permission which is assigned based on the second application as a photoshop application. The photo, the unique ID, and the access permission are stored in the data distribution layer of the mobile device. The photo application communicates its ownership of the photo to the photo application's service provider using the unique ID. The user may share the photo through an instant messaging application. The instant messaging application requests the photo. The instant messaging application receives the unique ID, and sends a request for the photo with the unique ID that was assigned to the photo by the photo application. The access controller layer receives this request for the photo. The access controller layer retrieves and provides the photo based on the access permission to the instant messaging application in response to determining that the instant messaging application has provided the corresponding unique ID. Only those applications having the unique ID may access the photo via the data distribution layer. The second application does not duplicate a copy of the original photo on the mobile device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   receiving a data object from a first application running on a computing device;
   receiving a unique identifier (ID) of the data object, the unique ID being assigned by the first application;
   receiving an access permission for the data object from the first application;
   storing the data object, the unique ID, and the access permission in a data repository in a data distributor layer on the computing device;
   receiving, at an access controller layer of the computing device, a request for the data object from a second application running on the computing device, the request including the unique ID;
   retrieving, by the access controller layer, the data object from the data distributor layer using the unique ID in response to the request; and
   providing, by the access controller layer, the data object to the second application.

2. The computer-implemented method of claim 1, wherein the unique ID is not a filename of the data object.

3. The computer-implemented method of claim 1, wherein the second application does not store a copy of the data object.

4. The computer-implemented method of claim 1, comprising receiving a request to share the data object via the second application; determining whether the second application has permission to access the data object based on the access permission; and sending the unique ID to the second application in response to determining that the second application has permission to access the data object for enabling the second application to request the data object using the unique ID.

5. The computer-implemented method of claim 1, wherein the access permission is set based on parameters provided by a service provider of the first application.

6. The computer-implemented method of claim 1, wherein the second application asserts ownership of the data object by providing the unique ID to a service provider of the second application without duplicating the data object.

7. The computer-implemented method of claim 1, wherein the first application maintains the unique ID of the data object.

8. The computer-implemented method of claim 1, wherein the first application communicates ownership of the data object to a service provider using the unique ID of the data object.

9. A computer program product for adaptive on-device management across multiple applications, the computer program product comprising a computer readable storage medium having program instructions embodied therewith, wherein the computer readable storage medium is not a transitory signal per se, the program instructions executable by a computer to cause the computer to perform a method comprising:
   receiving a data object from a first application running on a computing device;
   receiving a unique identifier (ID) of the data object, the unique ID being assigned by the first application;
   receiving an access permission for the data object from the first application;
   storing the data object, the unique ID, and the access permission in a data repository in a data distributor layer on the computing device;
   receiving, at an access controller layer of the computing device, a request for the data object from a second application running on the computing device, the request including the unique ID;
   retrieving, by the access controller layer, the data object from the data distributor layer using the unique ID in response to the request; and
   providing, by the access controller layer, the data object to the second application.

10. The computer program product of claim 9, wherein the unique ID is not a filename of the data object.

11. The computer program product of claim 9, wherein the second application does not store a copy of the data object.

12. The computer program product of claim 9, comprising receiving a request to share the data object via the second application; determining whether the second application has permission to access the data object based on the access permission; and sending the unique ID to the second application in response to determining that the second application has permission to access the data object for enabling the second application to request the data object using the unique ID.

13. The computer program product of claim 9, wherein the access permission is set based on parameters provided by a service provider of the first application.

14. The computer program product of claim 9, wherein the second application asserts ownership of the data object by providing the unique ID to a service provider of the second application without duplicating the data object.

15. The computer program product of claim 9, wherein the first application maintains the unique ID of the data object.

16. The computer program product of claim 9, wherein the first application communicates ownership of the data object to a service provider using the unique ID of the data object.

17. A system, comprising:
a processor;
a memory coupled to the processor; and
logic integrated with the processor, executable by the processor, or integrated with and executable by the processor, the logic being configured to:
receive a data object from a first application running on a computing device;
receive a unique identifier (ID) of the data object, the unique ID being assigned by the first application;
receive an access permission for the data object from the first application;
store the data object, the unique ID, and the access permission in a data repository in a data distributor layer on the computing device;
receive, at an access controller layer of the computing device, a request for the data object from a second application running on the computing device, the request including the unique ID;
retrieve, by the access controller layer, the data object from the data distributor layer using the unique ID in response to the request; and
provide, by the access controller layer, the data object to the second application.

18. The system of claim 17, wherein the unique ID is not a filename of the data object.

19. The system of claim 17, wherein the second application does not store a copy of the data object.

20. The system of claim 17, comprising receiving a request to share the data object via the second application; determining whether the second application has permission to access the data object based on the access permission; and sending the unique ID to the second application in response to determining that the second application has permission to access the data object, wherein the second application.

* * * * *